April 5, 1927.
C. PINTACUDA ET AL
1,623,069
DEVICE FOR DETERMINING PRESSURE IN VEHICLE SHOCK ABSORBERS
Filed March 26, 1924
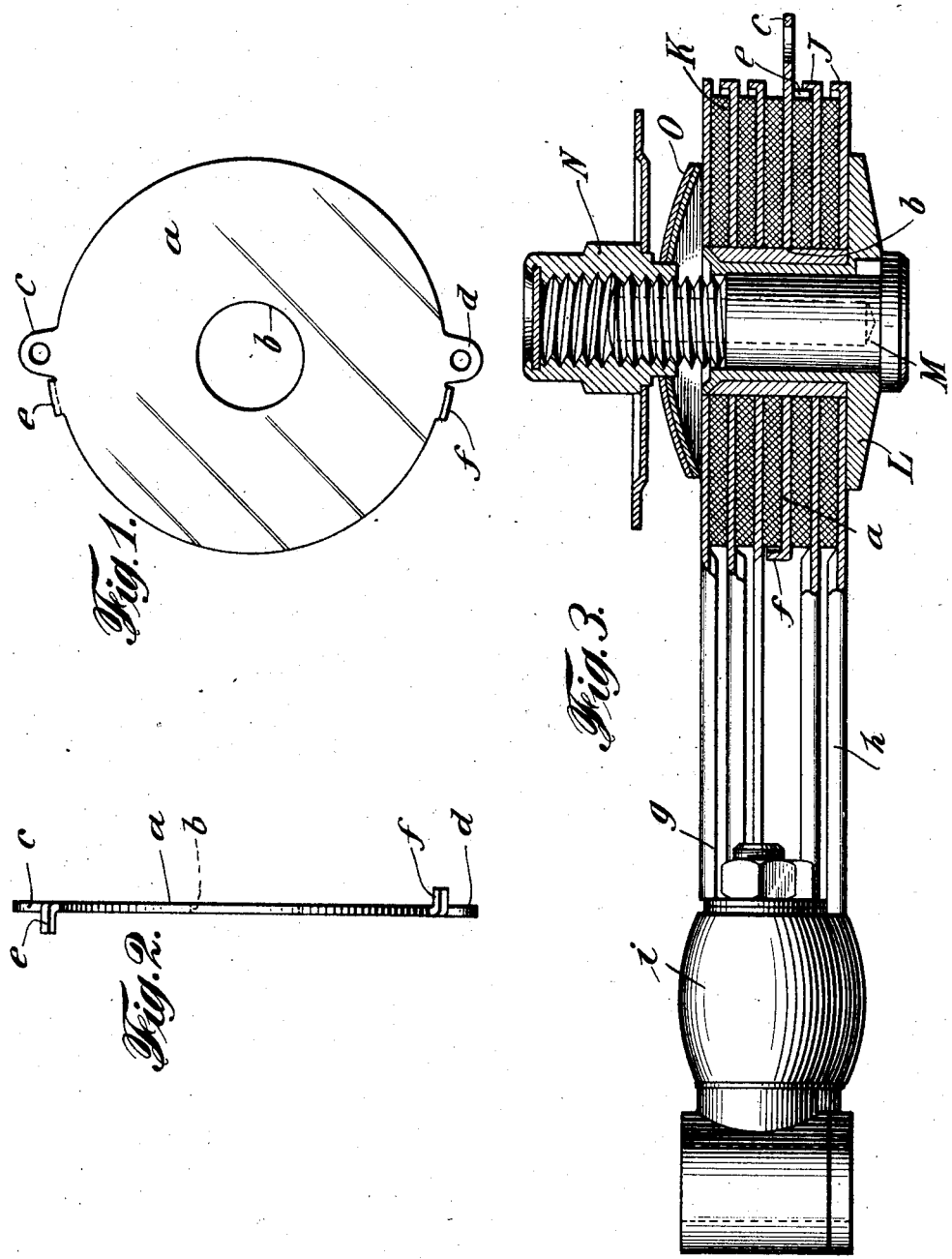
INVENTORS.
Carlo Pintacuda and
Ugo Frilli
BY
ATTORNEY.

Patented Apr. 5, 1927.

1,623,069

UNITED STATES PATENT OFFICE.

CARLO PINTACUDA AND UGO FRILLI, OF FLORENCE, ITALY.

DEVICE FOR DETERMINING PRESSURE IN VEHICLE SHOCK ABSORBERS.

Application filed March 26, 1924, Serial No. 702,083, and in Italy October 20, 1923.

The invention relates to a device for use in ascertaining at any moment the degree of pressure or friction obtaining between the frictional disks such as are usually employed as braking means or dampers of the movements occurring between the wheels and the chassis of motor vehicles. The system is such that the degree of friction may, it is repeated, be ascertained at any moment, through this device concerned, even when mounted and in operation.

The system consists essentially in a means comprising an element inserted between or against the frictional members, such element being left independent of the usual lever arms intended to act on the frictional members.

This element may also be placed outside the frictional packing proper, provided it be positioned in such manner as to be subjected to the pressure imparted to the frictional packing members.

It will thus be understood that whilst the members of the frictional packing which are connected with the lever arms cannot undergo any movement other than that imparted to them by the movements of the lever arms, the independent element is free to move independently of said arms. But said independent element is subjected to the pressure obtaining in the frictional packing, so that when it is moved from without, the state of friction is gauged by the manual effort required to turn the element or as indicated by an index—or in any other manner—when carried out by means of any suitable device.

The device preferably consists of a disk provided with small projecting lugs, and introduced between the disks constituting the frictional packings, in such manner as to be operated by means of the lugs from the outside—as stated—independently of the arms of the shock-absorber.

By means of a slight movement in a rotary direction, imparted to said disk, the degree of friction obtaining in the frictional packing can be gauged.

In the drawings:

Fig. 1 is a face view of the friction testing device;

Fig. 2 is an end view thereof; and

Fig. 3 is a top view of the shock absorber, parts being broken away to show the friction testing device in position.

Referring more particularly to the drawings, the character $a$ designates in general a friction testing disc constructed in accordance with the present invention. The disc $a$ is provided with a central opening $b$, through which the pin of the frictional packing (hereinafter described) is adapted to extend. The disc is provided with perforated lugs $c$, $d$, which are adapted to receive and cooperate with a suitable tool employed for rotating the disc. The disc is also provided with oppositely extending bent tongues $e$, $f$, to limit the rotary movement of the testing disc in a manner hereinafter described.

Referring now to Figure 3, the testing disc $a$ is shown assembled with a shock absorber. The shock absorber illustrated is of a well-known type and since it does not constitute an essential part of the present invention, it will not be described in detail, reference being made only to such parts as may be necessary for a complete understanding of the present invention. The shock absorber comprises upper and lower lever arms $g$ and $h$ respectively, one end of the former being fixedly secured by means of the bearings $i$ to the vehicle spring, while the corresponding end of the lower lever arm is similarly secured to the vehicle chassis. The opposite ends of the lever arms are provided with friction members $j$ between which are interposed friction washers $k$ of wood, leather, fiber or other suitable material. The friction members and washers are provided with a central aperture for the reception of a hollow hub member $l$. A bolt $m$ passes through the hub member and carries on its threaded end the pressure nut $n$. A spring plate $o$ is interposed between the nut and the adjacent friction members, and the tension of the spring plate is regulated by the nut to control the friction between the friction members in a manner readily understood.

The friction testing disc $a$ is mounted between the friction members $k$ in the manner shown in Fig. 3, and is located in frictional engagement with the faces of adjacent friction members. Since the pressure on the testing disc is the same as that on the friction members, the amount of friction between the latter can be determined by the force required to rotate the testing disc against the existing pressure. The friction testing disc is rotated by applying a suitable tool to the perforated lugs. The tongs $e$, $f$ are adapted to engage the upper and lower lever arms respectively of the shock absorbers, in order to limit the rotation of the testing disc during use and prevent the operating lugs from turning into an inaccessible position.

Claims:

1. A device for use in testing the resistance to relative turning movement of frictional packings in vehicle shock absorbers of the character described comprising an element in frictional contact with the said packing, and means for facilitating the turning of the said element in contact with the said packing and independently of the arms of the shock absorber.

2. A device for testing the resistance to relative turning movement of frictional packings in vehicle shock absorbers, comprising a disc having a central aperture therein, and means for facilitating the turning of said disc.

3. A device for testing the resistance to relative turning movement of frictional packings in vehicle shock absorbers, comprising a disc in frictional contact with said packing, said disc being formed to receive a tool for turning the disc in contact with the said packing and independently of the arms of the shock absorber.

4. A device for testing the resistance to relative turning movement of frictional packings in vehicle shock absorbers, comprising a disc in frictional contact with said packing, and lugs projecting outwardly from said disc adapted to cooperate with a tool for turning the disc with respect to said packing.

5. A device for testing the resistance to relative turning movement of frictional packings in vehicle shock absorbers, comprising a disc in frictional contact with said packing, lugs projecting outwardly from said disc adapted to cooperate with a tool for turning the disc with respect to said packing, and means for limiting the rotation of the disc.

CARLO PINTACUDA. [L. S.]
  UGO FRILLI. [L. S.]